United States Patent [19]

Komoto et al.

[11] Patent Number: 4,476,948
[45] Date of Patent: Oct. 16, 1984

[54] AMPHIBIAN VEHICLE

[75] Inventors: Mikihisa Komoto; Masatoshi Nakamura, both of Tokyo, Japan

[73] Assignee: Mitsui Engineering & Shipbuilding Co., Ltd., Tokyo, Japan

[21] Appl. No.: 392,068

[22] Filed: Jun. 25, 1982

[30] Foreign Application Priority Data

Feb. 27, 1982 [JP] Japan ................................ 57-31005

[51] Int. Cl.³ .............................................. B60F 3/00
[52] U.S. Cl. ...................................... 180/7.2; 114/270
[58] Field of Search .................. 180/7 A; 114/270; 440/98; 305/60

[56] References Cited

U.S. PATENT DOCUMENTS 2,154,191 4/1939 Welsh .................................. 440/98
2,706,958 4/1955 Cotting et al. .................... 180/7 A
3,397,668 8/1968 Mainguy ............................ 180/7 A Primary Examiner—Joseph F. Peters, Jr.
Assistant Examiner—Donn McGiehan
Attorney, Agent, or Firm—Armstrong, Nikaido, Marmelstein & Kubovcik

[57] ABSTRACT

An amphibian vehicle having a vehicle body, and at least a pair of floaters attached to the vehicle body, each of which floaters consists of a cylindrical body having a buoyancy, and a helical blade fixed to the outer circumferential surface of the cylindrical body. This amphibian vehicle is formed such that the water line of the amphibian vehicle at a front end surface of each of the floaters is not higher than the center line thereof, with the water line of said amphibian vehicle at a rear end surface of each of the floaters not higher than a level which is higher than the center line of each of the floaters by 30% of the diameter thereof.

6 Claims, 15 Drawing Figures

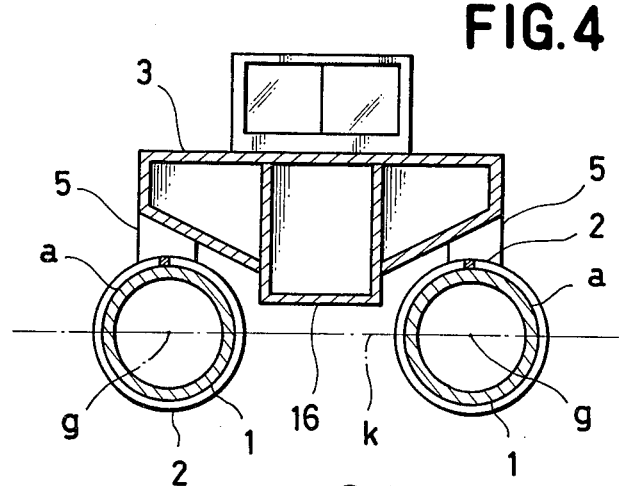
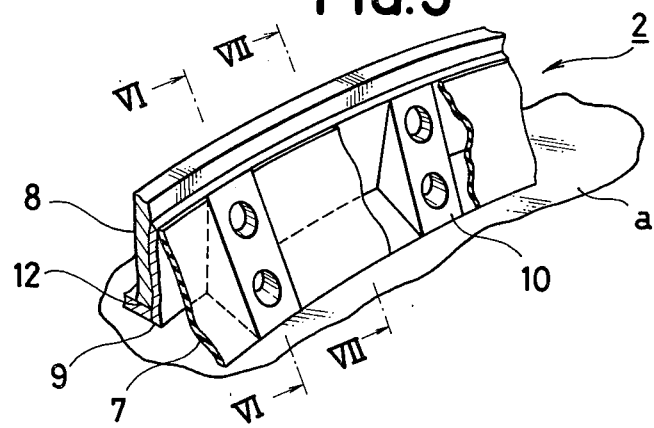
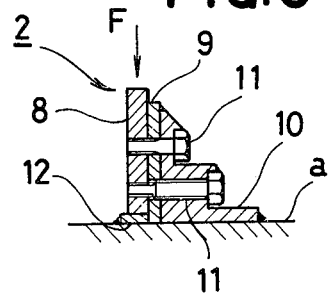
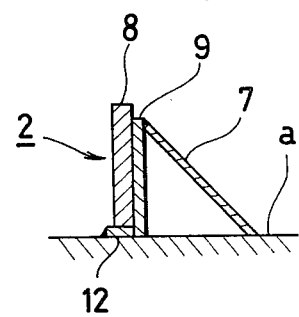

AMPHIBIAN VEHICLE

BACKGROUND OF THE INVENTION

This invention relates to an amphibian vehicle, and more particularly to an amphibian vehicle capable of running in an unfrozen water area, an icy water area, or a muddy area by means of floaters, each of which consists of a cylindrical body having buoyancy and provided with helical blades on the outer circumferential surface thereof.

The moving units employed in conventional amphibian vehicles are mainly a crawler type moving unit using endless tracks and a combination moving unit in which a vehicle and propellers are united with one another. However, an amphibian vehicle employing the former moving unit has an extremely low running performance, and an amphibian vehicle employing the latter moving unit has great difficulties in running in a sludgy and muddy area.

On the other hand, the development of resources in cold sea areas including the development of oil fields in the North Sea areas has been carried out actively in recent years. An amphibian vehicle running in a cold sea area, especially, a frozen sea area must be able to run freely in a sea area with no ice (an unfrozen sea area), a sea area with comparatively small blocks of ice in great concentrations (a broken ice sea area), and a sea area covered with ice which is thick enough to bear the weight of the amphibian vehicle (a thick-ice-covered sea area). Also, such an amphibian vehicle must be able to break comparatively thin ice continuously, run from an unfrozen or a broken ice sea area onto an ice surface, and travel from an on-ice area into an unfrozen or a broken-ice sea area. Since an amphibian vehicle runs in a frozen sea area in various manners as mentioned above, it must also have excellent stability and maneuverability.

SUMMARY OF THE INVENTION

A primary object of the present invention is to provide an amphibian vehicle which meets the above-mentioned requirements.

Another object of the present invention is to improve the running performance of an amphibian vehicle, particularly that from a water area onto an ice surface.

The present invention provides an amphibian vehicle having a vehicle body, and at least a pair of floaters attached to the vehicle body, each of which floaters consists of a cylindrical body having buoyancy, and a helical blade fixed to the outer circumferential surface of the cylindrical body, characterized in that the water line of the amphibian vehicle at the front end of each of the floaters is not higher than the center line thereof, with the water line of the amphibian vehicle at a rear end of each of the floaters not higher than the center line of each of the floaters by 30% of the diameter thereof.

The above and other objects as well as advantageous features of the invention will become apparent from the following description of the preferred embodiments taken in conjunction with the accompanying drawings.

BRIEF DESCRIPTION OF THE DRAWINGS

FIG. 4 is a sectional view taken along the line IV—IV in FIG. 3;

FIG. 5 is a perspective view of a blade;

FIG. 6 is a sectional view taken along the line VI—VI in FIG. 5;

FIG. 7 is a sectional view taken along the line VII—VII in FIG. 5;

DESCRIPTION OF THE PREFERRED EMBODIMENTS

Figure 1:
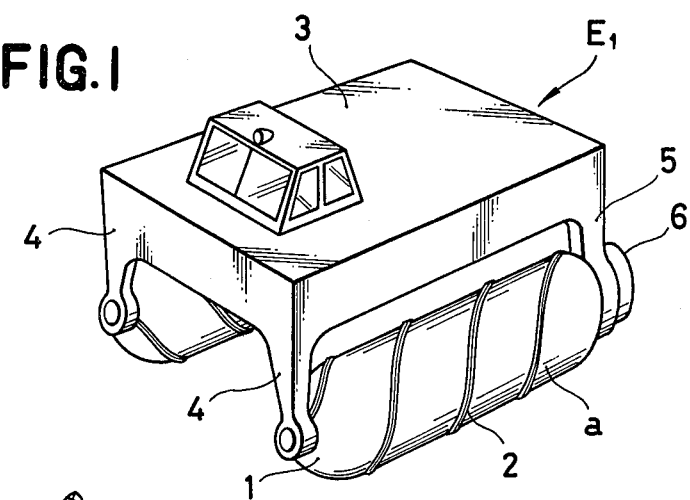
FIG. 1 is a perspective view of an amphibian vehicle according to the present invention.

As shown in FIG. 1, an amphibian vehicle $E_1$ according to the present invention is formed by rotatably supported floaters 1, each of which consists of a cylindrical body a having a buoyancy, and a spiral blade 2 fixed helically to the outer circumferential surface of the cylindrical body a, and front right and left struts 4 and 4 and rear right and left struts 5 and 5, which struts 4, 4, 5 and 5 extend downward from a vehicle body 3.

Figure 2:
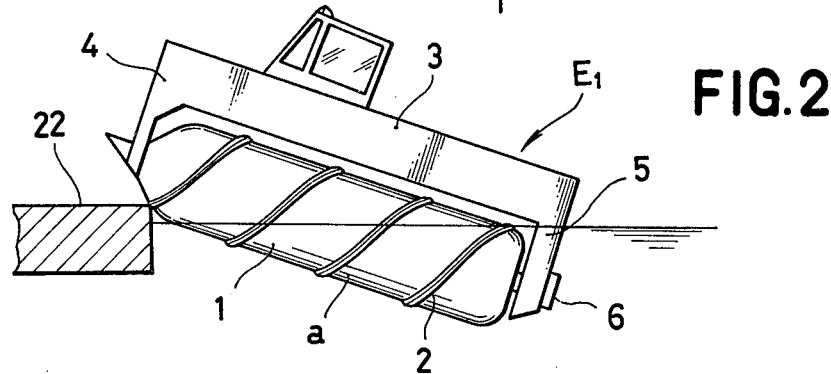
FIG. 2 is a side elevational view of the amphibian vehicle according to the present invention running from a water area onto ice surface.

Each of the cylindrical bodies a is streamlined at the front end portion thereof as shown in FIG. 2. The directions in which the blades 2 fixed to the outer circumferential surfaces of the cylindrical bodies a extend are opposite to each other.

Accordingly, when the right and left floaters 1 and 1 are rotated in the opposite directions at the same rotational speed, a propulsive force is generated in the direction of the floater axes to drive the amphibian vehicle $E_1$ forward or backward. When the right and left floaters are rotated at different rotational speeds, the amphibian vehicle $E_1$ can be turned. The amphibian vehicle $E_1$ can also be moved sideways in a sludgy and muddy area or on ice by rotating the right and left floaters 1 and 1 in the same direction at the same speed. When the right and left floaters 1 and 1 are rotated in the same direction at the same number of revolutions per minute on an open water or a broken ice area, the propulsive force is generated in the opposite directions in the right and left floaters 1 and 1 so that the amphibian vehicle can be turned in the same place owing to the resulting moment of rotation. When the amphibian vehicle $E_1$ runs from a water area onto ice surface 22, the blades 2 bite into the ice as shown in FIG. 2.

As shown in FIG. 4, it is desirable that a bottom portion 16 of the vehicle body 3 be in a position higher than a line k connecting the centers g of the floaters 1.

Lowering the vehicle body 3 deep into the water while the amphibian vehicle runs in an unfrozen or broken ice area contributes to the generation of buoyancy in the amphibian vehicle but it causes an increase in the propulsion resistance therein. Therefore, lowering the vehicle body 3 deep into water in such water areas is undesirable. Especially, in a broken ice area, small pieces of ice accumulate on the front portion of the vehicle and increase the propulsion resistance to a great extent. This can even prevent the amphibian vehicle from advancing in some cases. On a soft surface of a road, such as a deeply snow-covered surface of a road, the blade-carrying rotary cylindrical floaters 1 sink thereinto. Consequently, the bottom portion 16 comes into press-contact with the snow surface to possibly prevent the amphibian vehicle from being moved forward.

Figure 3:
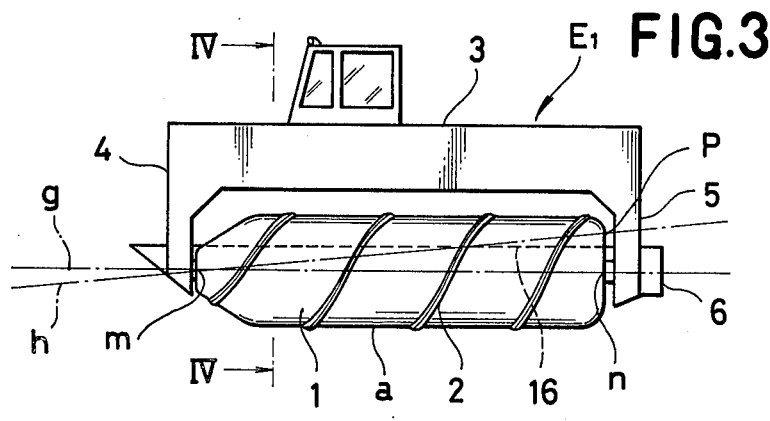
FIG. 3 is a side elevational view of the amphibian vehicle according to the present invention.

In order to propel the amphibian vehicle $E_1$, comparatively large output and torque are required, so that a heavy driving unit must be used. For the purpose of eliminating these inconveniences, a greater part of both of the floaters 1 and the vehicle body 3 is made of an aluminum alloy to reduce the weight thereof. In order to improve the propelling performance of the amphibian vehicle and the performance of the vehicle to run up from a water area onto ice surface, as shown in FIG. 3 the vehicle is formed such that the water line h at the front end of floaters 1 is not higher than the intersection point m of the front surface and the center line g of the floaters 1 with the water line h at the rear end of the floaters 1 disposed at a point p the height of which is, from the intersection point n of the rear end surface and the center line g of the floaters 1, less than 30% of the diameter of the floaters (the diameter of the floaters exclusive of the blade 2 provided thereon). When the water line h rear of the floaters 1 becomes higher than the position p, which is above the point n by less than 30% of the diameter of each of the floaters 1, the trim of the amphibian vehicle is excessively raised when the vehicle runs up on ice from water, so that the vehicle becomes unstable.

As mentioned above, the amphibian vehicle must be light in weight. A greater part of the amphibian vehicle according to the present invention consists of a light alloy, including the floaters 1. When the blades 2 are formed of a light alloy (for example, aluminum alloy), the blade tip which rubs violently against a road surface may wear quickly. Therefore, it is necessary that at least the blades 2 consist of a material (for example, steel) having a high wear resistance.

Bolts may be suitably used to fasten the blades 2 to the cylindrical bodies a when the blades 2 consist of an unweldable material or when blades consisting of clad steel cannot be formed.

As shown in FIGS. 5-7, a blade seat 12 and a vertical blade support member 9 are welded along the portion of the outer surface of the cylindrical body a to which the blade 2 is to be fastened. Bolt holding elements 10 are then welded at predetermined intervals. A blade body 8 made of steel is joined to the vertical blade support member 9 with bolts 11 in such a manner that the blade body 8 is in contact with the blade seat 12. Bolt-holes in the blade body 8 are provided with female threads. The blade seat 12 is provided for the purpose of receiving the vertical component F of the force applied to the blade body 8.

Blade reinforcing plates 7 are welded in places between adjacent bolt holding elements 10 in such a manner that the outer surfaces of the former are aligned with those of the latter so as not to cause an increase in the resistance while the blade 2 is rotated. The blade reinforcing plates 7 also increase the strength of the blade 2. If the blade body 8 is joined to the vertical blade member 9 with bolts, it can be conveniently replaced when its edge becomes worn.

The blade reinforcing plates 7 are provided preferably on the front side of the blade 2 with respect to the direction in which the amphibian vehicle is moved forward.

Figure 8:
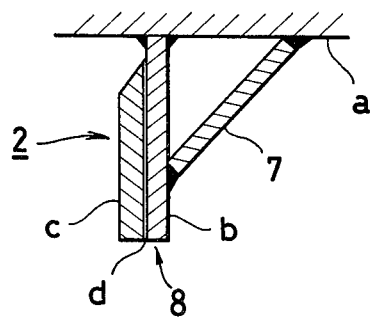
FIGS. 8 and 9 are sectional views of other examples of the blade.

The blade 2 may be formed as shown in FIG. 8, by welding the blade body 8 to the cylindrical body a. The blade body is formed with a clad material prepared by explosive-cladding a metal member b which can be welded to the cylindrical body a, and a wear-resistant metal member c, and then welding the blade reinforcing plates 7 by using the same metal as used for the cylindrical body a. This allows the blade body 8 to be formed with a wear-resistant material irrespective of the material forming the cylindrical body a (provided that a clad material can be used). Moreover, the blade body 8 consisting of a wear-resistant material causes only a little increase in the weight of the blade 2.

A metal member d shown in FIG. 8 is inserted between the metal members b and c to form the clad material when the metal member b and c cannot be explosive cladded to each other directly.

Figure 9:
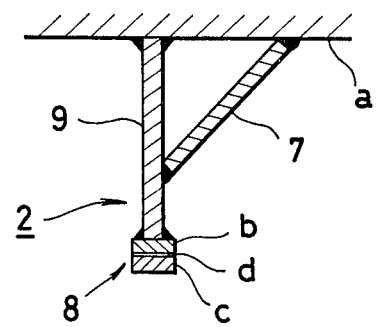

As shown in FIG. 9, further, in structuring the blade 2 the blade body 8 of a clad material may be structured such that the metal member b and the vertical 9 are connected together by welding, with the wear resistant metal member c disposed at the tip of the blade structure, whereby it is feasible to remarkably reduce the amount consumed of the clad material.

Figure 10:
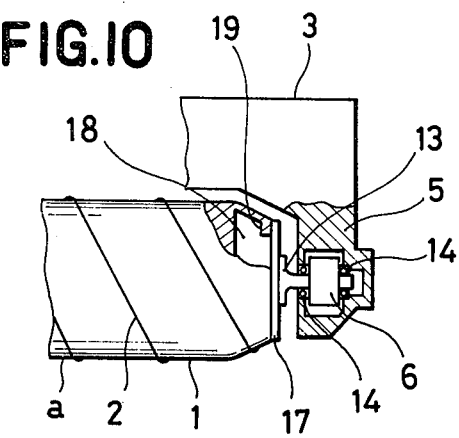
FIG. 10 is a side elevational view partially in section, illustrating the condition of a floater and a driving shaft connected together.
Figure 11:
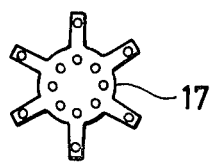
FIGS. 11 and 12 are plan views of different types of flexible plates.
Figure 12:
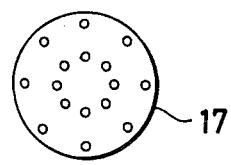

When the amphibian vehicle $E_1$ runs from a water area onto an ice surface, a heavy shock may be applied to each driving means 6 consisting of a hydraulic motor for example, via the floaters 1. This shock can be lessened by connecting the floaters 1 and driving shafts 13 via flexible plates 17. Namely, as shown in FIG. 10, a cavity 18 may be provided in a rear end portion of each of the floaters 1, and a star-shaped flexible plate 17 as shown in FIG. 11 or a disc type flexible plate 17 as shown in FIG. 12 may be attached to a flange 19 with bolts (not shown). The flexible plate 17 is formed of a resilient steel plate. The driving shaft 13, which is rotated by the driving means 6, is fastened to the flexible plate 17 with bolts (not shown). Reference numeral 14 denotes a thrust bearing. Thus, the shock imparted to the floater 1 is absorbed therein as the flexible plate 17 is bent, so that shock otherwise likely to be transmitted to the driving shaft 13 can be lessened.

Figure 13:
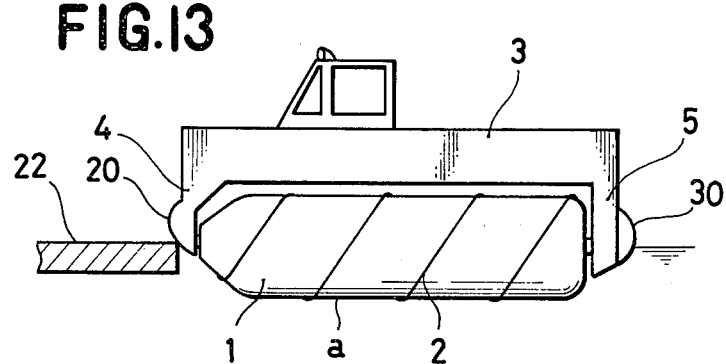
FIGS. 13 and 14 are side elevational views of amphibian vehicles according to the present invention provided with different types of guides on front surfaces of struts thereof.
Figure 14:
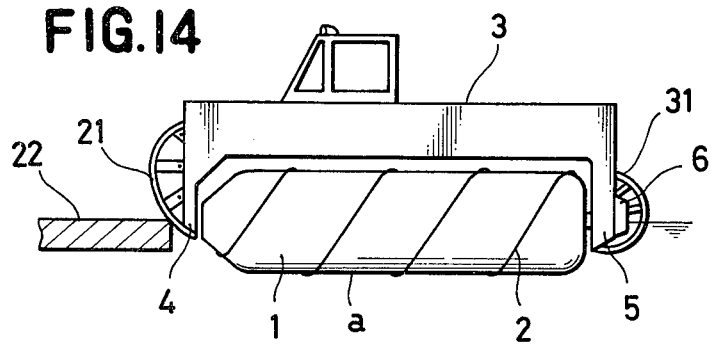

In order that the amphibian vehicle can ride onto an ice surface easily, a spherical guide 20 as shown in FIG. 13 or a sleigh type guide 21 as shown in FIG. 14 may be provided on the front surface of the strut 4.

Further, for a protection of the driving means 6 upon or during a backward motion of the vehicle, it may be devised to provide at a rear end portion of the vehicle a spherical surface guide 30 as shown in FIG. 13 or a sleigh-like guide 31 as shown in FIG. 14.

Figure 15:
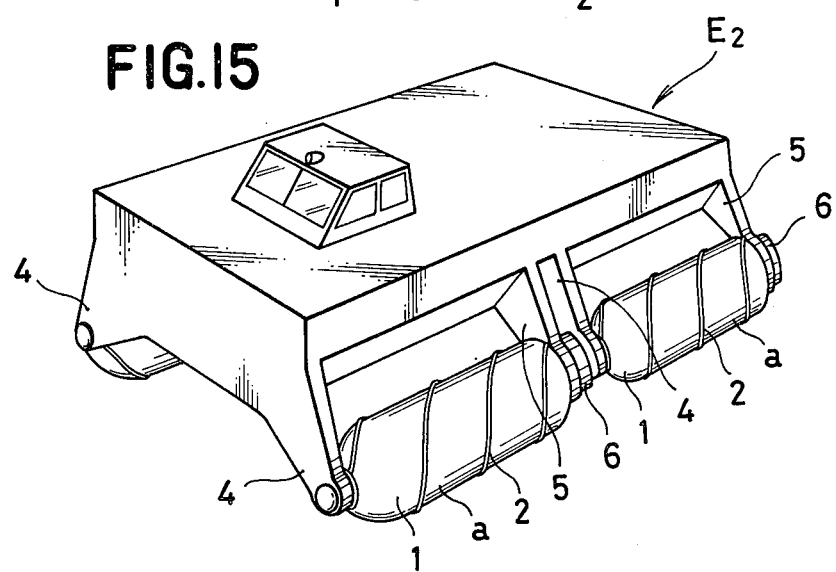
FIG. 15 is a perspective view of another embodiment of the amphibian vehicle according to the present invention, which is provided with front and rear pairs of floaters connected together.

An amphibian vehicle $E_2$ shown in FIG. 15 is provided with two pairs of floaters at the front and rear sides of the vehicle body 3. Thus, a larger-scale amphibian vehicle having a plurality of pairs of floaters 1 of an identical shape to the vehicle body 3 can be built. When a plurality of pairs of floaters are used, the tractive force for pulling a barge and so forth can be increased.

Since the amphibian vehicle according to the present invention is structured as described above, in a manner such that its water line in the front end of floaters is located not higher than the center line of the floaters and in the rear end of floaters, not higher than the center line of the floaters a distance exceeding 30% of the floater diameter, so that the vehicle can exhibit a desirable running stability and a high maneuverability.

What is claimed is:

1. An amphibian vehicle for use in ice-forming water areas having a vehicle body, and at least a pair of floaters attached to said vehicle body, each of which floaters consists of a bouyant cylindrical body having a tapered forward end, and a helical blade fixed to the outer circumferential surface of said cylindrical body including said tapered end, characterized in that the waterline of said amphibian vehicle at the front of each of said floaters is not higher than the centerline thereof, with the waterline of said amphibian vehicle at the rear of each of said floaters not higher than 30% of the floater diameter above the centerline of each of said floaters.

2. An amphibian vehicle according to claim 1, wherein each of said floaters and a driving shaft therefor are connected to each other via a flexible plate.

3. An amphibian vehicle as claimed in claim 1, wherein said helical blade comprises:

a blade support member fixed to said cylindrical body to stand on the outer surface of the cylindrical body and extend helically;

bolt holding elements fixed to said cylindrical body at intervals along said blade support member;

a blade body made of steel and disposed along the blade support member, said blade body, blade support member and bolt holding elements all being fastened together and to the floater with bolts; and blade reinforcing plates disposed between each adjacent bolt holding element.

4. An amphibian vehicle as claimed in claim 1, wherein said helical blade comprises a blade body made of a clad material comprising a member capable of being welded to said cylindrical body and a wear-resistant member, said blade body being fixed to said cylindrical body to stand on the outer surface of the cylindrical body and extend helically, said blade body further being supported by diagonally applied reinforcing plates.

5. An amphibian vehicle as claimed in claim 1, wherein said floaters are rotatably supported by front struts and rear struts, said front struts and said rear struts having spherical guides on the front side end and the rear side end thereof respectively.

6. An amphibian vehicle as claimed in claim 1, wherein said helical blade comprises a blade support member fixed to said cylindrical body to stand on the outer surface of the cylindrical body, and a blade body made of a clad material composed of a member capable of being welded to said cylindrical body and a wear-resistant member, said blade body being fixed on the top edge of said blade support member with said wear-resistant member disposed outside.

* * * * *